United States Patent
Häußermann

(10) Patent No.: US 10,509,453 B2
(45) Date of Patent: Dec. 17, 2019

(54) ELECTRONIC COMMUNICATIONS DEVICE, PARTICULARLY POWER-OVER-ETHERNET TERMINAL, AS WELL AS ADD-ON BOARD

(71) Applicant: Fujitsu Technology Solutions Intellectual Property GmbH, München (DE)

(72) Inventor: Rudolf Häußermann, München (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 95 days.

(21) Appl. No.: 15/933,882

(22) Filed: Mar. 23, 2018

(65) Prior Publication Data
US 2018/0284860 A1    Oct. 4, 2018

(30) Foreign Application Priority Data
Mar. 30, 2017   (DE) .................. 10 2017 106 901

(51) Int. Cl.
*G06F 1/26* (2006.01)
*H04L 12/10* (2006.01)
*H01R 13/66* (2006.01)

(52) U.S. Cl.
CPC .............. *G06F 1/266* (2013.01); *G06F 1/26* (2013.01); *H01R 13/66* (2013.01); *H04L 12/10* (2013.01)

(58) Field of Classification Search
CPC .......... G06F 1/266; G06F 1/26; H01R 13/66; H04L 12/10
See application file for complete search history.

(56) References Cited

U.S. PATENT DOCUMENTS

| | | |
|---|---|---|
| 2007/0274322 A1 | 11/2007 | Hansalia |
| 2010/0106984 A1 | 4/2010 | Weng et al. |
| 2011/0217873 A1 | 9/2011 | Diab et al. |
| 2013/0339760 A1 | 12/2013 | Zimmerman et al. |

*Primary Examiner* — Robert L Deberadinis
(74) *Attorney, Agent, or Firm* — DLA Piper LLP

(57) ABSTRACT

A Power-over-Ethernet terminal includes a plurality of components including at least one network communications port, a first plug connector electrically coupled with the network communications port, a first isolating transformer configured for the decoupling of signals, the first isolating transformer electrically coupled with the first plug connector, and a network communications unit electrically couplable with the first isolating transformer, wherein the first plug connector is configured to be selectively connected to at least one bridging element or an add-on board, such that when the at least one bridging element is connected to the first plug connector, a direct electric connection between the communications port and the first isolating transformer is established, and when the add-on board is connected to the first plug connector, an indirect electric connection between the network communications port and the network communications unit via a second isolating transformer arranged on the add-on board is established.

20 Claims, 2 Drawing Sheets

ELECTRONIC COMMUNICATIONS DEVICE, PARTICULARLY POWER-OVER-ETHERNET TERMINAL, AS WELL AS ADD-ON BOARD

TECHNICAL FIELD

This disclosure relates to an electronic communications device, including a system board with components of the electronic device arranged thereon and, in particular, a so-called Power-over-Ethernet terminal. The disclosure further relates to an add-on board that connects to at least one plug connector of an electronic communications device connectable to a communications network.

BACKGROUND

A plurality of electronic communications devices are known. So-called Power-over-Ethernet (PoE) terminals can, via an Ethernet connection used for communication, additionally also be supplied with a supply voltage so that the provision of a further connecting cable, in particular of a power cable, or a further, external power supply is not required.

Despite the fundamental benefits of a remote power supplying of electronic communications devices, such a remote power supply is, in practice, only used in a comparatively low number of communications devices, in which a local supplying of the communications device with a supply voltage is not possible or desired. This, among other things, has to do with the fact that, in the case of usage, as a rule, an entire communications network must be made PoE-capable, and the length of the individual connecting lines is limited.

In a full-equipping of a system board of an electronic communications device with all components required for a remote power supplying via a communications network, a loss of efficiency for the producer, as well as also for the user of the communications device, necessarily occurs.

Electronic communications devices with retrofittable PoE components are therefore known. For example, a subsequently-mountable PoE module with the designation "D3200" is available for the so-called thin client computer "Futro X" of the manufacturer Fujitsu Technology Solutions GmbH. The PoE module includes in particular a switching converter that converts a remote power supply voltage provided via a communications port into a local supply voltage. On the system board of the thin client computer itself, an isolating transformer for the decoupling of an Ethernet connector from an Ethernet module is present, which likewise is arranged on the system board. Despite the fundamentally modular approach of the known solution, the system board is still comparatively elaborate, as it includes at least several PoE-capable components.

It could therefore be helpful to provide an alternative construction concept for an electronic communications device, which preferably leads to a better energy efficiency of the overall system. Preferably, the communications device can be easily retrofittable from a local power supply to a remote power supply.

SUMMARY

I provide a Power-over-Ethernet terminal including a system board and a plurality of components arranged thereon, the plurality of components including at least one network communications port, a first plug connector electrically coupled with the network communications port, a first isolating transformer configured for the decoupling of signals transmitted via the network communications port, the first isolating transformer electrically coupled with the first plug connector, and a network communications unit electrically couplable with the first isolating transformer; wherein the first plug connector is configured to be selectively connected to at least one bridging element or an add-on board, such that when the at least one bridging element is connected to the first plug connector, a direct electric connection between the communications port and the first isolating transformer is established, and when the add-on board is connected to the first plug connector, an indirect electric connection between the network communications port and the network communications unit via a second isolating transformer arranged on the add-on board is established.

I also provide an add-on board that connects to the first plug connector of the Power-over-Ethernet terminal including a system board and a plurality of components arranged thereon, the plurality of components including at least one network communications port, a first plug connector electrically coupled with the network communications port, a first isolating transformer configured for the decoupling of signals transmitted via the network communications port, the first isolating transformer electrically coupled with the first plug connector, and a network communications unit electrically couplable with the first isolating transformer; wherein the first plug connector is configured to be selectively connected to at least one bridging element or an add-on board, such that when the at least one bridging element is connected to the first plug connector, a direct electric connection between the communications port and the first isolating transformer is established, and when the add-on board is connected to the first plug connector, an indirect electric connection between the network communications port and the network communications unit via a second isolating transformer arranged on the add-on board is established, including a first mating connector that connects the add-on board to the first plug connector of the Power-over-Ethernet terminal; a Power-over-Ethernet capable isolating transformer with at least one primary winding and at least one secondary winding, wherein the at least one primary winding is electrically coupled with the first mating connector; and at least one switching converter connected with the at least one primary winding that converts a first remote power supply voltage provided via the first mating connector into a supply voltage for supplying at least one component of the Power-over-Ethernet terminal with an operating energy.

I further provide an electronic communications device including a system board with a plurality of components arranged thereon, the plurality of components including at least one communications port, a first plug connector electrically coupled with the communications port, a first isolating transformer configured to decouple signals transmitted via the communications port, the first isolating transformer electrically coupled with the first plug connector, and a communications unit electrically couplable with the first isolating transformer, wherein the first plug connector is configured to be selectively connected to at least one bridging element or an add-on board such that when the at least one bridging element is connected to the first plug connector, a direct electric connection between the communications port and the first isolating transformer is established, and when the add-on board is connected to the first plug connector, an indirect electric connection between the communications port and the communications unit via at least one add-on component arranged on the add-on board is established.

Figure 1:
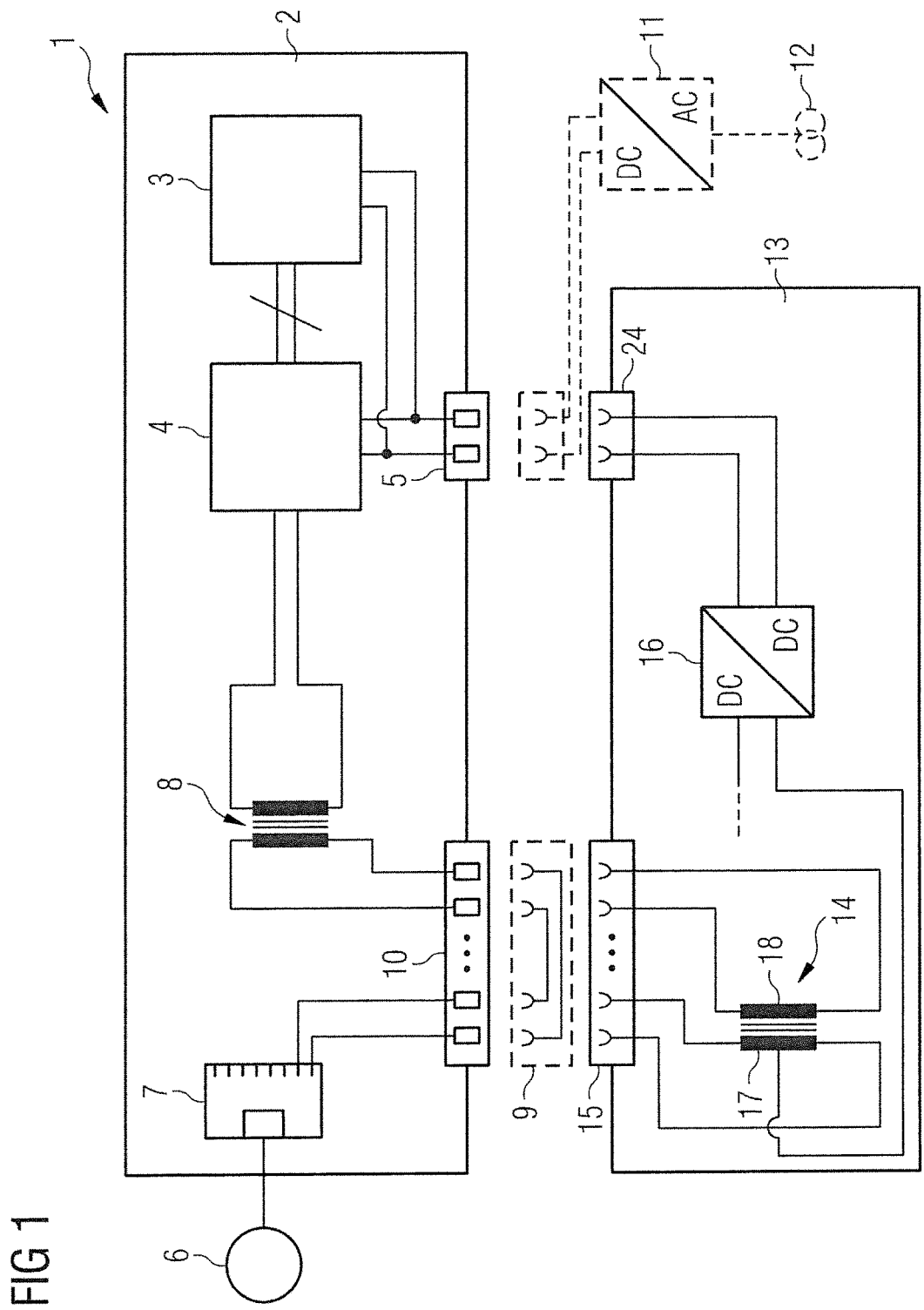
FIG. 1 is a schematic circuit diagram of an electronic communications device according to a first example.

LIST OF REFERENCE CHARACTERS 1 communications device
2 system board
3 processor
4 communications unit
5 supply connection
6 communications network
7 communications port
8 first isolating transformer
9 first jumper
10 first plug connector
11 power supply
12 power supply network
13 add-on board
14 second isolating transformer
15 first mating connector
16 switching converter
17 primary winding (of the second isolating transformer)
18 secondary winding (of the second isolating transformer)
19 second plug connector
20 second mating connector
21 second jumper
22 primary winding (of the first isolating transformer)
23 secondary winding (of the first isolating transformer)
24 plug connector

DETAILED DESCRIPTION

I provide an electronic communications device, in particular a Power-over-Ethernet terminal, including a system board with components of the electronic communications device arranged thereon. The components include at least one communications port, a first plug connector electrically coupled with the communications port, a first isolating transformer electrically coupled with the first plug connector for the decoupling of electric signals transmitted via the communications port, and a communications unit electrically couplable with the first isolating transformer. The first plug connector is set up for the selective connecting of at least one bridging element or an add-on board so that, in the event of the connecting of at least one bridging element, a direct electrical connection between the communications port and the first isolating transformer is established. In the event of the connecting of an add-on board, an indirect electric connection will be established via at least one add-on component arranged on the add-on board, between the communications port and the communications unit.

Through the above-mentioned arrangement, all components, which place special demands on a remote power supplying via a communications network, can be outsourced to an add-on board. In the far-more common event that no remote power supplying is desired, a communications port arranged on the system board, can, by using a simple bridging element and a simple isolating transformer for the electric decoupling of electric signals transmitted via the communications port, be connected with a communications unit likewise arranged on the system board. In the less-common event that a remote power supplying is desired via a communications network, the signals received from the communications port can already be pre-processed before the first isolating transformer on an add-on board. PoE-compatible components, for example, a PoE-capable isolating transformer that divides the incoming electric signals, can then be provided on the add-on board. The thus carried communications signal is, in this case, indirectly returned, via the add-on board, to the communications unit of the system board.

The first isolating transformer may be electrically coupled with the communications unit in a fixed manner and, in the connecting of an add-on board, an electric connection is established between the add-on component arranged on the add-on board and the first isolating transformer arranged on the system board to the communications unit via the first plug connector. In this very simply constructed arrangement, the add-on board loops-in an additional component of an otherwise unaltered electric connecting path of the system board.

Alternatively, the system board further comprises a second plug connector electrically coupled with the first isolating transformer and the communications link, wherein, in the event of the connecting of at least one bridging element, an electric connection between the first isolating transformer, via the second plug connector, to the communications link is established. In the event of a connecting of the add-on board, an electric connection between the additional components arranged on the add-on board, via the second plug connector, bypassing the first isolating transformer, to the communications unit arranged on the system board is established. Such an approach possesses the advantage that, in the event of a remote power supplying, if necessary, the no longer required electric insulation can be electrically bypassed via the first isolating transformer.

The electronic communications device may further include an add-on board connected to the first plug connector, wherein the at least one additional component arranged on the add-on board includes a second isolating transformer. In this manner, an isolating transformer can be easily retrofitted in an electronic communications device which is suitable for a direct-voltage component used for remote power supply.

Preferably, the saturation flux density of the first isolating transformer is lower than the saturation flux density of the second isolating transformer. The always-connected first isolating transformer and, in particular its core, can hereby be configured to be smaller than the core of the only optionally to be retrofitted second isolating transformer.

The add-on board may further comprise a switching converter that converts a first remote power supply voltage provided via the communications port and the first plug connector into a supply voltage to supply at least one component of the system board. In this manner, practically all additionally required components for the remote power supply of the communications device can be arranged on the add-on board.

The electronic communications device may further include a jumper connected to the first plug connector that directly connects at least a first signal line, electrically connected with the communications port, with a second signal line, electrically connected with the first isolating transformer. Through the connecting of the signal lines via a jumper, an electrically direct and technically particularly simple and cost-effective connection between the communications port and the first isolating transformer can be established.

An add-on board that connects to at least a first plug connector of an electronic communications device connectable to a communications network may be provided. The add-on board comprises at least one first mating connector that connects the add-on board to the at least one first connecting plug of the electronic communications device, at least one PoE-capable isolating transformer with at least one primary winding and at least one secondary winding, and at least one switching converter that converts a first remote power supply voltage provided via the first mating connector into a supply voltage that supplies at least one component of the electronic device. The at least one primary winding is thus electrically coupled with the first mating connector, and the at least one secondary winding is electrically coupled with the first mating connector or the secondary mating connector of the add-on board.

Such an add-on board is particularly suited to upgrade a PoE functionality in an electronic communications device.

Further advantages are disclosed in the subsequent description of examples. My devices are described below using examples by referring to the attached figures. Identical reference characters are used for identical or similar components of different examples.

FIG. 1 schematically shows the circuit plan of an electronic communications device 1. The example thus concerns, for example, a so-called thin client computer. Alternatively, however, it can concern other communications devices such as, for example, a PoE-capable IP telephone, a digital media player, or a network component such as, for example, a WLAN access point.

The electronic communications device 1 includes a system board 2, on which different components for electronic data processing are arranged. In the represented example, the system board 2 includes, among other things, a processor 3, as well as a communications unit 4 connected thereto. The communications unit 4 relates, for example, to an Ethernet interface controller. It is certainly also possible that the components 3 and 4 are combined in a single chip, for example, a so-called System-on-a-chip (SoC). For their operation, the processor 3, as well as also the communications unit 4 require a supply voltage. This is provided in the example via a supply voltage connection 5, for example, in form of a plug connector.

The electronic communications device 1 is connected with a communications network 6 via a communications port 7. In the example, the communications device 1 can, for example, be connected via a so-called RJ45-connection and a corresponding LAN cable with a network jack, for example, a local network installation or a local router or switch. To avoid damaging the communications device 1, and in particular the communications unit 4, the communications port 7 is not directly connected with the communications unit 4. Instead, an intermediate first plug connector 10, as well as a first isolating transformer 8 are arranged on the system board 2, which substantially serves to electrically insulate the communications network 6 from the communications device 1. On the secondary side, the isolating transformer 8 is, via corresponding conductor tracks, electrically connected with the communications unit 4 in a fixed manner.

In FIG. 1, a first equipment version, for example, upon delivery of the communications device 1 is indicated via dotted lines. In this configuration, a jumper 9 bridges a plurality of plug-in contacts of the first plug connector 10 of the system board 2 so that the communications port 7 is connected with the first isolating transformer 8 on the first side. Without connection of the jumper 9, the individual signal lines between the communications port 7 and the first isolating transformer 8 are separated from one another by contrast so that a communication cannot take place. For the power supply, an additional power supply 11 is required in this equipment version. For this purpose, the power supply 11 is, for example, connected to a primary mains alternating voltage 12 of a public power supply network 12. In the illustrated example, the power supply 11 is an external power supply, which provides the supply voltage via the same supply connection 5. Alternatively, an internal power supply 11, if necessary even arranged on the system board 2, can also be used. In addition, the supply voltage can also be provided via a different plug connector.

In an alternative equipment version, the supply of the communications device 1 with the supply voltage occurs, by contrast, via an add-on board 13 of the electronic communications device 1 likewise represented in the FIG. 1. The add-on board 13 can relate, for example, to an internal expansion card of a thin client computer, which, if needed, i.e., when the communications device 1 connects to a PoE-capable communications network 6, is upgraded. In this case, provision of the components 9, 11 and 12 can be dispensed with. Instead, the expansion card 13 is preferably plugged directly onto the first plug connector 10. Alternatively, it is certainly also possible to provide a cable connection between the first plug connector 10 and the add-on board 13.

In the described example, the add-on board 13 substantially includes a second isolating transformer 14, a first mating connector 15, as well as a switching converter 16. During operation, the mating connector 15 is connected with the plug connector 10. In this manner, the input signal of the communications port 7 goes directly to a primary winding 17 of the second isolating transformer 14. Already on the side of the primary winding 17, a direct voltage component of the input signal is picked up via corresponding ports and fed to the switching converter 16. For the sake of simple presentation, only a tapping of the first pair of wires is represented in FIG. 1. A further input of the switching converter is connected with a tap of a further pair of wires not represented. On the secondary side, the second isolating transformer 14 comprises a further winding 18, via which the actual desired signal, i.e., the communications signal according to, for example, the Ethernet standard, is returned back to further contacts of the first mating plug connector 15. From there, it goes via the first plug connector 10 back to the first isolating transformer 8, and further to the communications unit 4. At the output of the switching connector 16, the supply voltage for the system board 2 is provided, which, for example, is output via a corresponding plug connector 24 of the add-on board 13 to the supply voltage connection 5.

In the described example, the two isolating transformers 8 and 14 differ in particular in their dimensioning. Due to the direct voltage component present at the input side in the PoE case, and optionally present asymmetries of the network cable used to connect, the second isolating transformer 14 is more heavily loaded electrically. Accordingly, a comparatively large-dimensioned transformer core with a relatively high saturation flux density is required to satisfy the requirements of the PoE standard. In contrast, the first isolating transformer 8 can be equipped with a comparatively simpler and small core with a lower saturation flux density. In operation with the upstream second isolating transformer 14, as well as also in the pure network operation without a remote power supply, no direct voltage component is present thus on the primary side on the first isolating transformer 8, which would lead to a saturation of its core.

Figure 2:
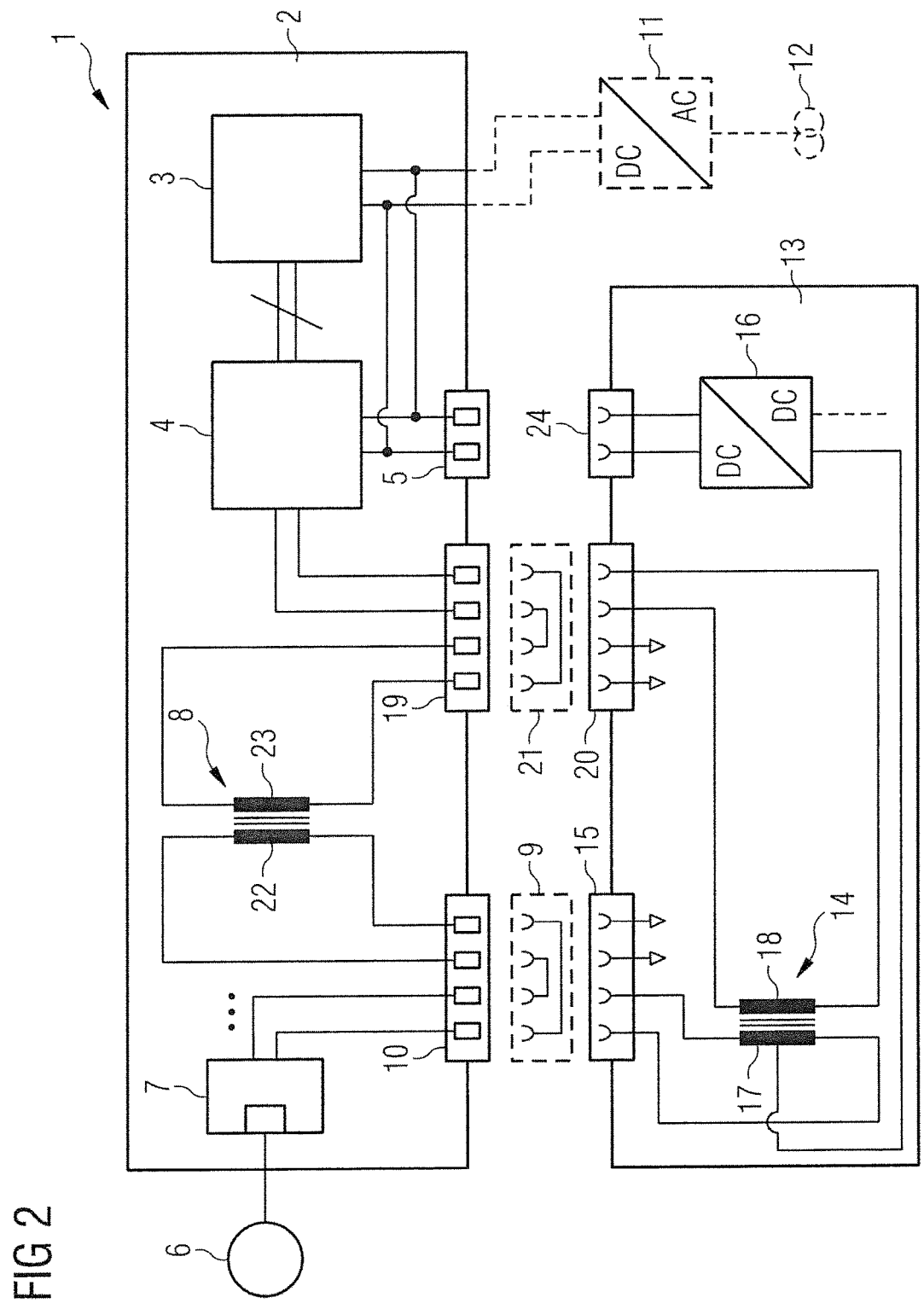
FIG. 2 is a schematic circuit diagram of an electronic communications device according to a second example.

FIG. 2 shows an alternative example of a communications device 1. In the represented example, the communications device 1 includes a system board 2, as well as an add-on board 13. The components arranged on the boards 2 and 13 correspond substantially to the components according to the example of FIG. 1, and are therefore not described in detail again. The example according to FIG. 2 differs from the example according to FIG. 1, in that the connection between the system board 2 and the add-on board 13 occurs via two separated plug connectors 10 and 19 and corresponding mating connectors 15 and 20. The second plug connector 19 serves in particular to separate the electric connection between the first isolating transformer 8 and the communications unit 4.

As shown in FIG. 2, the first plug connector 10 connects the communications port 7 with a primary winding 22 of the first isolating transformer 8 of the system board 2, or the primary winding 17 of the second isolating transformer 14 of the add-on board 13. In contrast, the second plug connector 19 connects the communications unit 4 either with a secondary winding 23 of the first isolating transformer 8, or with the secondary winding 18 of the second isolating transformer 14. In this example, the first isolating transformer 8 is hereby completely bypassed when the add-on board 13 is connected, and replaced through the second isolating transformer 8. Apart from that, construction and functioning of the communications device 1 correspond to the construction and the function according to the first example.

It is to understood that in the Figures, for reasons of simpler representation, only a single pair of wires of the communications unit 4 or of the communications port 7 is shown. In practice, particularly current Ethernet connections use up to four pairs of wires, and thereby eight lines. Correspondingly the plug connectors 10 and 19, the mating connectors 15 to 20, as well as the isolating transformers 8 and 14 are provided in a multipolar manner to ensure an electric separation of each pair of wires.

In the equipment variant shown in dashed lines in FIG. 2 without remote power supply, two jumpers 9 and 21 are utilized to establish a primary-sided connection between the communications port 7 and the primary winding 22 of the first isolating transformer 8, or the second winding 23 of the first isolating transformer 8 and the communications unit 4. Depending on the spatial arrangement of the plug connectors 10 and 19, as well as the number of the signal lines to be connected, alternatively a single multipolar jumper and/or a combined plug connection can also be used. Conversely, each signal line of the plug connectors 10 and 19 can also be bridged via individual short-circuit bridges, so-called jumpers. Likewise, it is also possible to combine the supply connection 5 and/or the plug connector 24 with the plug connectors 10 and 19, or the mating connectors 15 and 20. Finally, the power supply 11 can likewise be arranged on the system board 2.

The invention claimed is:

1. A Power-over-Ethernet terminal comprising a system board and a plurality of components arranged thereon,
the plurality of components comprising at least one network communications port, a first plug connector electrically coupled with the network communications port, a first isolating transformer configured for the decoupling of signals transmitted via the network communications port, the first isolating transformer electrically coupled with the first plug connector, and a network communications unit electrically couplable with the first isolating transformer,
wherein the first plug connector is configured to be selectively connected to at least one bridging element or an add-on board, such that
when the at least one bridging element is connected to the first plug connector, a direct electric connection between the communications port and the first isolating transformer is established, and
when the add-on board is connected to the first plug connector, an indirect electric connection between the network communications port and the network communications unit via a second isolating transformer arranged on the add-on board is established.

2. The Power-over-Ethernet terminal according to claim 1,
wherein the first isolating transformer is electrically coupled with the network communications unit by a direct electrical connection; and
when the add-on board is connected to the first plug connector, an electrical connection from the second isolating transformer arranged on the add-on board via the first plug connector and the first isolating transformer arranged on the system board to the network communications unit is established.

3. The Power-over-Ethernet terminal according to claim 1,
wherein the system board further comprises a second plug connector electrically coupled with the first isolating transformer and the network communications unit,
when the at least one bridging element is connected to the first plug connector, an electric connection from the first isolating transformer via the second plug connector to the communications unit is established, and
when the add-one board is connected to the first plug connector, an electric connection from the second isolating transformer arranged on the add-on board via the second plug connector to the network communications unit arranged on the system board is established, which bypasses the first isolating transformer.

4. The Power-over-Ethernet terminal according to claim 1, further comprising the add-on board with the second isolating transformer arranged thereon, the add-on board being connected to the first plug connector.

5. The Power-over-Ethernet terminal according to claim 4, wherein the saturation flux density of the first isolating transformer is lower than the saturation flux density of the second isolating transformer.

6. The Power-over-Ethernet terminal according to claim 4, wherein the second isolating transformer meets the requirements of at least one of the following standards: IEEE 802.3af-2003, IEEE 802.3at-2009 and IEEE P802.3bt.

7. The Power-over-Ethernet terminal according to claim 4, wherein the add-on board further comprises a switching converter that converts a first remote power supply voltage provided via the network communications port and the first plug connector to the second isolating transformer into a supply voltage for the supply of at least one component of the plurality of components of the system board.

8. The Power-over-Ethernet terminal according to claim 7, wherein the system board comprises a third plug connector that receives the supply voltage provided by the switching converter of the add-on board.

9. The Power-over-Ethernet terminal according to claim 1, further comprising the at least one bridging element connected to the first plug connector, which directly connects at least one first signal line, electrically connected with the first network communications port, with a second signal line electrically connected with the first isolating transformer.

10. An add-on board that connects to the first plug connector of the Power-over-Ethernet terminal according to claim 1, comprising:
a first mating connector that connects the add-on board to the first plug connector of the Power-over-Ethernet terminal;
a Power-over-Ethernet capable isolating transformer with at least one primary winding and at least one secondary winding, wherein the at least one primary winding is electrically coupled with the first mating connector; and
at least one switching converter connected with the at least one primary winding that converts a first remote power supply voltage provided via the first mating connector into a supply voltage for supplying at least one component of the Power-over-Ethernet terminal with an operating energy.

11. The add-on-board according to claim 10, wherein the at least one secondary winding is electrically coupled with the first mating connector such that a network signal received from the at least one network communications port is transmitted via the second isolating transformer and the first isolating transformer to the network communications unit.

12. The add-on-board according to claim 10, further comprising second mating connector that connects the add-on board to at least second plug connector of the Power-over-Ethernet terminal, wherein the at least one secondary winding is electrically coupled with the second mating connector of the add-on board such that a network signal received from the at least one network communications port is transmitted only via the second isolating transformer to the network communications unit and bypasses the first isolating transformer.

13. An electronic communications device comprising a system board with a plurality of components arranged thereon,
the plurality of components comprising at least one communications port, a first plug connector electrically coupled with the communications port, a first isolating transformer configured to decouple signals transmitted via the communications port, the first isolating transformer electrically coupled with the first plug connector, and a communications unit electrically couplable with the first isolating transformer,
wherein the first plug connector is configured to be selectively connected to at least one bridging element or an add-on board such that
when the at least one bridging element is connected to the first plug connector, a direct electric connection between the communications port and the first isolating transformer is established, and
when the add-on board is connected to the first plug connector, an indirect electric connection between the communications port and the communications unit via at least one add-on component arranged on the add-on board is established.

14. The electronic communications device according to claim 13,
wherein the first isolating transformer is electrically coupled with the communications unit by a direct electrical connection, and when the add-on board is connected to the first plug connector, an electrical connection from the add-on component arranged on the add-on board via the first plug connector and the first isolating transformer arranged on the system board to the communications unit is established.

15. The electronic communications device according to claim 13,
wherein the system board further comprises a second plug connector electrically coupled with the first isolating transformer and the communications unit,
when the at least one bridging element is connected to the first plug connector, an electric connection from the first isolating transformer via the second plug connector to the communications unit is established, and
when the add-one board is connected to the first plug connector, an electric connection from the add-on component arranged on the add-on board via the second plug connector to the communications unit arranged on the system board is established, which bypasses the first isolating transformer.

16. The electronic communications device according claim 13, further comprising the add-on board connected to the first plug connector, wherein the at least one add-on component arranged on the add-on board comprises a second isolating transformer.

17. The electronic communications device according to claim 16, wherein the saturation flux density of the first isolating transformer is lower than the saturation flux density of the second isolating transformer.

18. The electronic communications device according to claim 16, wherein the add-on board further comprises a switching converter for converting a direct current remote power supply voltage provided via the communications port and the first plug connector to the second isolating transformer into a supply voltage for the supply of at least one component of the plurality of components of the system board.

19. The electronic communications device according to claim 18, wherein the add-on board further comprises a first mating connector that connects the add-on board to the first plug connector of the electronic communications device, wherein at least one primary winding of the second isolating transformer is electrically coupled with the first mating connector and the switching converter, and at least one secondary winding of the second isolating transformer is electrically coupled with the first mating connector, such that a high-frequency communication signal received from the at least one communications port is transmitted via the second isolating transformer and the first isolating transformer to the communications unit.

20. The electronic communications device according to claim 18, wherein the system board further comprises a second plug connector electrically coupled with the first isolating transformer and the communications unit, and the add-on board further comprises a first mating connector and a second mating connector that connects the add-on board to the first plug connector and the second plug connector of the electronic communications device, respectively, wherein at least one primary winding of the second isolating transformer is electrically coupled with the first mating connector and the switching converter, and at least one secondary winding of the second isolating transformer is electrically coupled with the second mating connector such that a high-frequency communication signal received from the at least one communications port is transmitted only via the second isolating transformer to the communications unit and bypasses the first isolating transformer.

* * * * *